US 6,735,190 B1

(12) United States Patent
Chuah et al.

(10) Patent No.: US 6,735,190 B1
(45) Date of Patent: May 11, 2004

(54) PACKET TRANSPORT METHOD DEVICE UTILIZING HEADER REMOVAL FIELDS

(75) Inventors: Mooi Choo Chuah, Eatontown, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/176,707

(22) Filed: Oct. 21, 1998

(51) Int. Cl.$^7$ ................................................. H04L 12/66
(52) U.S. Cl. ........................ 370/352; 370/400; 370/401
(58) Field of Search ................................. 370/352–354, 370/356, 389, 392, 395.5, 395.52, 395.53, 400, 401, 404, 405, 408, 409, 395.31

(56) References Cited

U.S. PATENT DOCUMENTS

| | | | |
|---|---|---|---|
| 5,455,825 A | | 10/1995 | Lauer et al. ................... 370/60 |
| 5,471,467 A | | 11/1995 | Johaan ......................... 370/60 |
| 5,732,080 A | | 3/1998 | Ferguson et al. ............. 370/392 |
| 5,790,545 A | | 8/1998 | Holt et al. .................... 370/398 |
| 5,809,027 A | | 9/1998 | Kim et al. .................... 370/451 |
| 5,959,989 A | * | 9/1999 | Gleeson et al. .............. 370/390 |
| 5,996,021 A | * | 11/1999 | Civanlar et al. ............. 370/392 |
| 6,055,561 A | * | 4/2000 | Feldman et al. ............. 709/200 |
| 6,148,001 A | * | 11/2000 | Soirinsuo et al. ........ 370/395.4 |
| 6,151,318 A | * | 11/2000 | Woodward et al. .......... 370/392 |
| 6,466,985 B1 | * | 10/2002 | Goyal et al. ................. 370/236 |
| 6,580,537 B1 | * | 6/2003 | Chang et al. ................ 370/471 |

OTHER PUBLICATIONS

"Anomalies Due To Delay and Loss in AAL2 Packet Voice Systems: Performance Models and Methods of Mitigation"; K. Sriram, T.G. Lyons and Y–T Wang; Presented at INFORMS Telecomm. Conf., Boca Raton, Fl., Mar. 8–11, 1998.
"AAL–2—A New ATM Adaptation Layer for Small Packet Encapsulation and Multiplexing"; by J.H. Baldwin, B.H. Bharucha; B.T. Doshi; S. Dravida and S. Nanda; Bell Labs Technical Journal, vol. 2, No. 2, Spring 1997, pp. 111–131.

"MPLS Label Stack Encoding", by E.C. Rosen, Y. Rekhter, D. Farinacci, G. Fedorkow, T. Li and A. Conta; Internet Draft dated Oct. 2, 1998.

"LDP Specification"; by L. Andersson, P. Doolan, N. Feldman, A. Fredette, and R. Thomas; Internet Draft dated Oct. 2, 1998.

"A Framework for Multiprotocol Label Switching"; by R. Callon, P. Doolan, N. Feldman, A. Fredette, G. Swallow and A. Viswanathan; Internet Draft dated Oct. 2, 1998.

"A Simulation Study of IP Switching"; by S. Lin and N. McKeown; Proceedings of ACM Sigcomm Conference 1997; Computer Communication Review, vol. 27, No. 4, Oct. 1997, pp. 1524.

* cited by examiner

Primary Examiner—Phirin Sam
(74) Attorney, Agent, or Firm—Matthew J. Hodulik

(57) ABSTRACT

Overhead is reduced and packet transport efficiency is increased for a flow of switched packets from a router by identifying a plurality of packets having a common destination node within a network and transmitting at least one control message to establish the flow of switched packets; the at least one control message including: (i) a label mapping message corresponding to the flow of switched packets and (ii) a header removal field. Packet headers corresponding to packets of a switched packet flow are not parsed, therefore either the entire header, or a portion of the header, may be removed from each packet assigned a label. A header removal field is shared among routers while signaling to establish a labeled flow. The header removal field is used to provide header structure information to those routers which will be utilized for transport of the subsequent labeled flow. Thus, since layer two switching utilizes the appended label instead of the packet header for conveying a labeled packet, the packet header may be partially or completely removed. The header removal field is used to inform routers utilized for a labeled packet flow which portions of the subsequently conveyed packet headers will be removed and which portions will be present.

27 Claims, 9 Drawing Sheets

PACKET TRANSPORT METHOD DEVICE UTILIZING HEADER REMOVAL FIELDS

FIELD OF THE INVENTION

The present invention relates to the field of Internet Protocol Networks, and more particularly to methods for providing increased efficiency while utilizing label switching capabilities at Label Switching Routers within a Multi-Protocol Label Switching Network.

BACKGROUND OF THE INVENTION

The explosive growth of the Internet and private Intranets has resulted in a large and growing network infrastructure of Internet Protocol (IP) routers. The Internet is a packet-switched network, meaning that the data transmitted over the network is segmented and conveyed in packets. Unlike circuit-switched networks such as the public switched telephone network (PSTN), a packet-switched network is connectionless; that is, a dedicated end-to-end path does not need to be established for each transmission. Rather, each router calculates a preferred routing for a packet given current traffic patterns, and sends the packet to the next router. Thus, even two packets from the same message may not travel the same physical path through the network. This method is a type of layer three forwarding known as dynamic routing.

An IP packet is comprised of a packet data portion and an IP header. The IP header is comprised of a variety of header fields, including a source address, a destination address, and an IP header checksum. The IP header, and therefore those fields which comprise the IP header, represent a transmission overhead since header bits are transported along with the actual data bits for each packet. Additionally, since IP routers forward IP packets based on each packet's destination address, each IP packet header must be parsed at a controlling microprocessor in each router through which a packet is forwarded. The destination address associated with each respective packet is accessed by the microprocessor and a forwarding lookup table is utilized to forward each packet to a next router. Despite advances associated with processor speeds, the performance of forwarding algorithms and functions at each IP router utilizes precious router processing capacity and consequently limits the forwarding capacity of the routers.

A recently developed approach for improving the capacity at an IP router is through the use of label switching. Label switching is efficiently utilized in Multi-Protocol Label Switching networks incorporating a plurality of Label Switching Routers. A Label Switching Router is a router operable to forward IP packets conventionally via layer three forwarding, and additionally, is operable to perform layer two switching if a switching label is appended to the IP packet. Label switching is initiated by first identifying, at a Label Switching Router, a plurality of IP packets with a common destination address and a common source address. If the quantity of identified packets is greater than a predetermined threshold value, then a label is issued and communicated between router peers. Subsequently, all IP packets having that same common destination address and common source address have a label appended. The label is used to define a layer two switched-packet flow through one or more Label Switching Routers. Layer two switching can significantly increase the forwarding speed when compared to layer three forwarding. This is because the router microprocessor is relieved of the tasks of parsing each packet's IP header, calculating the next hop address, and forwarding the packet.

However, despite improvements in packet transport speed by using layer two label switching rather than conventional layer three forwarding, an additional bandwidth overhead is incurred in order to establish such a switched flow of labeled packets. Specifically, the overhead associated with a switched packet flow includes the appended switching label, in addition to the aforementioned packet header, for each packet transported by the switched packet flow. A reduction in the quantity of overhead expended for the transport of each packet would therefore result in a corresponding beneficial increase in packet transport efficiency.

SUMMARY OF THE INVENTION

We have realized that despite improvements in packet transport speed by using layer two label switching rather than conventional layer three forwarding, an additional overhead is incurred in order to establish such a switched flow of labeled packets. Specifically, the overhead associated with a switched packet flow includes the appended switching label, in addition to the aforementioned packet header, for each packet transported by the switched packet flow. A reduction in the quantity of overhead expended for the transport of each packet would therefore result in a corresponding beneficial increase in packet transport efficiency.

Therefore, overhead is reduced and packet transport efficiency is increased for a flow of switched packets by modifying the control message or messages used to establish the flow of switched packets to include a header removal field. Packet headers corresponding to packets of a switched packet flow are not parsed, therefore either the entire header, or a portion of the header, may be removed from each packet assigned a label. A header removal field is shared among routers while signaling to establish a labeled flow. The header removal field is used to provide header structure information to those routers which will be utilized for transport of the subsequent labeled flow. Thus, since layer two switching utilizes the appended label instead of the packet header for conveying a labeled packet, the packet header may be partially or completely removed. The header removal field is used to inform routers utilized for a labeled packet flow which portions of the subsequently conveyed packet headers will be removed and which portions will be present. The ability to remove at least a portion of the packet headers being transported, and the ability to communicate the exact header structure associated with packets within a flow, to the other routers used for conveying that flow, greatly reduces transmission overhead resulting in a correspondingly high packet transport efficiency.

In one embodiment of the present invention, a first value is assigned to the header removal field if the entire header is removed, a second value is assigned to the header removal field if only the destination address is removed, a third value is assigned to the header removal field if only the source address is removed, and a fourth value is assigned to the header removal field if none of the packet header fields are removed. This embodiment is especially advantageous in that it allows merging of individual flows having only one common originating or terminating node for that portion of a shared label switching path. The use of common labels, instead of the conventional practice of issuing a new label for each subsequently identified opportunity to establish a packet flow, allows routers to use and maintain a smaller quantity of total labels. Using and maintaining fewer labels at network routers has at least the following beneficial aspects: (i) reduced packet processing time at each switching router since routers maintain and access fewer labels, (ii)

lower switching costs as a result of fewer required label swaps at routers, and (iii) reduced overhead since the number of bits necessary to uniquely describe a smaller total number of labels is correspondingly smaller as well.

BRIEF DESCRIPTION OF THE DRAWINGS

A more complete understanding of the present invention may be obtained from consideration of the following description in conjunction with the drawings in which.

DETAILED DESCRIPTION

The following acronyms and associated expanded nomenclature are utilized throughout this description:

| CoS | Class of Service |
| --- | --- |
| CRC | Cyclical Redundancy Check |
| DIP | Destination Internet Protocol Address |
| HR | Header Removal |
| IETF | Internet Engineering Task Force |
| IP | Internet Protocol |
| ITS | Internet Telephony Server |
| LSP | Label Switching Path |

-continued

| LSR | Label Switching Router |
| --- | --- |
| MPEG | Moving Pictures Experts Group |
| MPLS | Multi-Protocol Label Switching |
| QoS | Quality of Service |
| S | Bottom of Stack Bit |
| SIP | Source Internet Protocol Address |
| SMD | Stream Member Descriptor |
| TTL | Time-to-Live |
| UMTS | Universal Mobile Telecommunications Systems |
| UDP | User Datagram Protocol |

Although the present invention is illustrated and described herein as an embodiment utilized for Internet telephony transport, the embodiment is merely illustrative and should not be construed as being so limited. The present invention is equally applicable for any packet type, whether voice, data, or multimedia, which is switched from a source address to a destination address using an appended label. The embodiment of the present invention utilized in conjunction with Internet telephony was selected merely in recognition that improvements in delay, jitter, transmission throughput, and efficiency are especially important for such an application.

Figure 1:
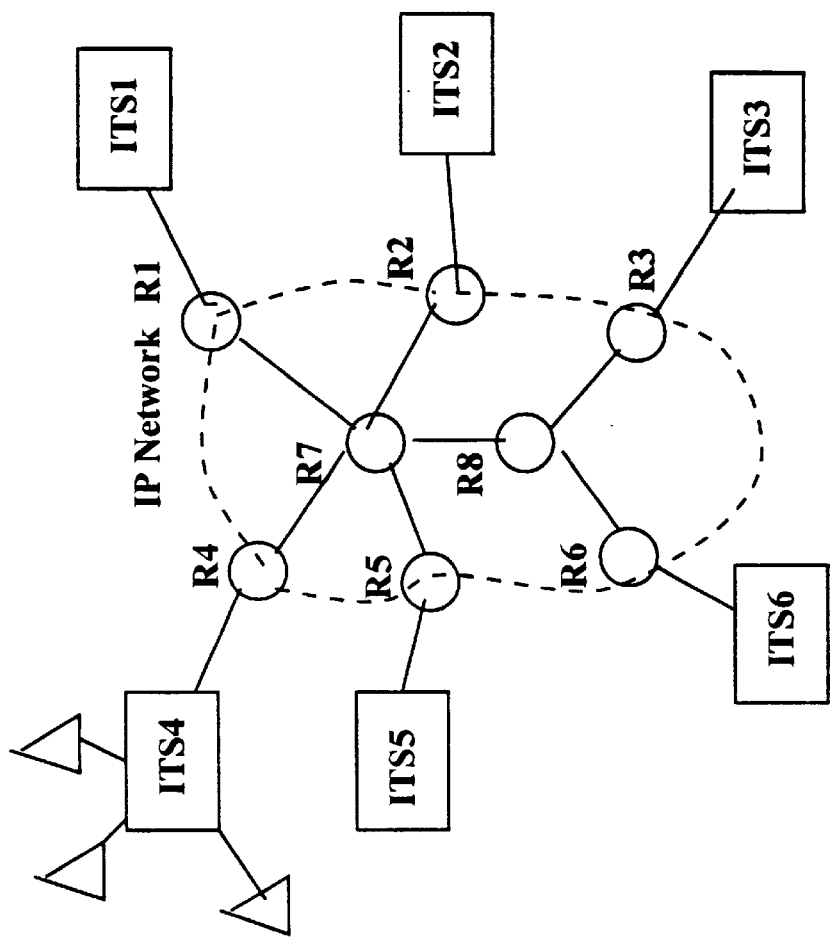
FIG. 1 is a diagram of a exemplary architecture currently used to transport voice over an Internet Protocol (IP) network.

Referring to FIG. 1, there is shown an exemplary architecture currently used to transport voice over an Internet Protocol (IP) network 100. The IP network is comprised of a plurality of individual routers 102, router R1 through router R8. A plurality of Internet Telephony Servers 104 are utilized, each Internet Telephony Server (ITS) individually coupled with a router 102 positioned at the periphery of the IP network 100. As illustrated, ITS-1 is coupled with R-1, ITS-2 is coupled with R-2, ITS-3 is coupled with R-3, ITS-4 is coupled with R-4, ITS-5 is coupled with R-5, and ITS-6 is coupled with R-6. Individual Internet Telephony Servers 104 are shown providing Internet telephony communications service to subscribers using access devices 106.

Figure 2:
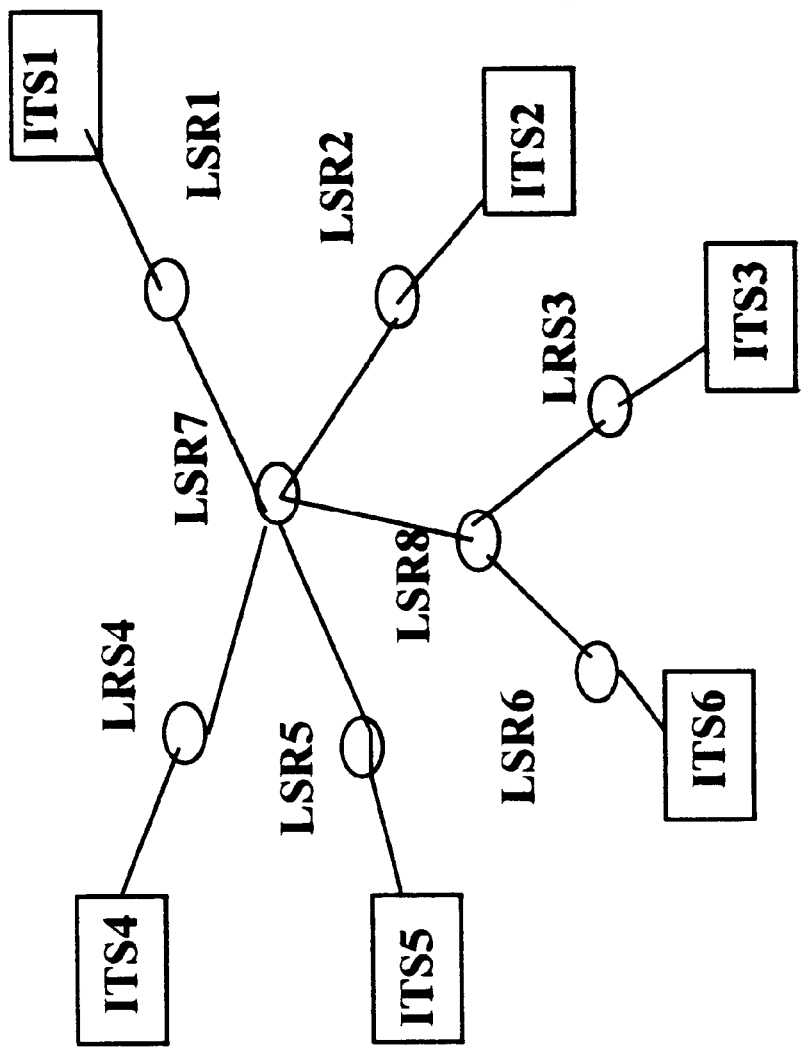
FIG. 2 is a diagram of an exemplary forwarding path over the network illustrated in FIG. 1.

Source PC access device S-1 initiates a call to destination PC access device D-1 by utilizing a conventional signaling message exchange between ITS-4 and ITS-1. FIG. 2 illustrates only those components and nodes included within an anticipated exemplary path between S-1 and D-1 over the network illustrated in FIG. 1. Access device S-1 is serviced by ITS-4 and access device D-1 is serviced by ITS-1. An exemplary path through the network 100 and between ITS-4 and ITS-1 is therefore through router nodes R-4, R-7, and R-1. Although communication between ITS-4 and ITS-1 is bi-directional, only that information transferred from source S-1 to destination D-1 is described, it being understood that information transferred from D-1 to S-1 would typically possess procedural and structural symmetry. ITS-4 creates an IP-in-IP tunnel with ITS-1 for transport of IP packets. That is, S-1 conveys a Structure "A" IP packet 210 to ITS-4 for eventual conveyance to D-1. Structure "A" IP packets 210 are comprised of a destination IP address (DIP) 212, a source IP address (SIP) 214, an IP packet payload 216, and a Cyclical Redundancy Check (CRC) value 218 for the IP header. ITS-4 creates the IP-in-IP tunnel by encapsulating the entire Structure "A" IP packet 210 with an ITS-1 DIP 222 and an ITS-4 SIP 224, thereby creating a Structure "B" IP packet 220. Therefore, Structure "B" IP packets 220 are routed through routers R-4, R-7, and R-1 to ITS-1. At ITS-1, the ITS-1 DIP 222 and ITS-4 SIP 224 encapsulations are removed to extract the original Structure "A" IP packets 210. Structure "A" IP packets are then conveyed from ITS-1 to D-1.

Recently Multi-Protocol Label Switching (MPLS) has been introduced to enable IP routers to perform layer two switching at the data link layer or layer three forwarding at the network layer. Routers operable to perform layer two switching and layer three forwarding are known as Label Switching Routers (LSRs). The Internet Engineering Task Force (IETF) develops parameter and protocol formats for inclusion within an MPLS standard. The method used for developing the MPLS standard is through the use of IETF MPLS framework draft documents. Currently, the IETF MPLS framework draft includes a core set of developed mechanisms. First, that semantics are assigned to a stream label; that is, individual labels are associated with specific individual packet streams. A packet stream is an aggregate of one or more packet flows. A packet stream is treated as an aggregate for purposes of forwarding and therefore may be described using only one label. Second, that IP packet forwarding efficiency is increased through the use of short fixed length labels identifying streams of IP packets between nodes. Third, that switching may require simple functions at each individual node, such as performing a table look-up or swapping a label. Fourth, that label distribution to network nodes will enable each node to determine which label to use for a specified stream of data.

Essential to the effective implementation of label switching is the notion that each label is bound to a specific network layer route. A particular network layer route over which a stream of packets is conveyed via switching is known as a flow. A control component is responsible for creating label bindings and for distributing label binding information to switches within the network. There are several methods utilized for distributing labels to network switches. Two such methods of label distribution are (i) upstream label assignment and distribution, and (ii) downstream label assignment and distribution. Furthermore, there are two classes of label distribution protocol messages; Advertisement class messages and Adjacency class messages. Advertisement class messages are used by Label Switching Routers (LSRs) to enable distribution of a label mapping for a packet stream to LSR peers. Adjacency class messages are utilized for initializing and maintaining a list of adjacent LSRs and revealing the characteristics of those adjacent LSRs.

Figure 3:
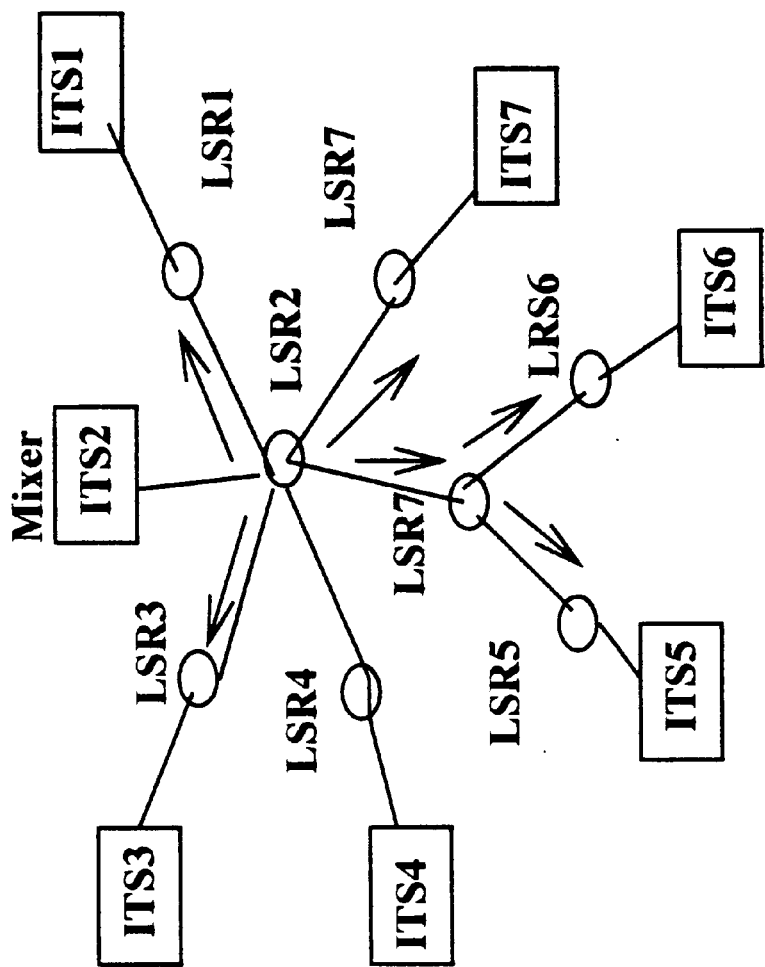
FIG. 3 is a diagram of the structure of a prior art Stream Member Descriptor subtype.

Advertisement class messages are further classified into several subtypes, including: (i) mapping, (ii) request, (iii) withdraw, (iv) release, (v) query, and (vi) acknowledge. A mapping Advertisement class message is used by a LSR to distribute a label mapping for a stream to its LSR peers. If a Label Switching Router (LSR) distributes a label mapping for a stream to multiple MPLS peers, a local determination is made at the LSR as to whether it will map a single label to the stream and distribute that mapping to all of its peers, or whether in the alternative, a unique label mapping is individually supplied to each of its peers. Each mapping Advertisement message includes a stream member descriptor (SMD) field and a label field. The IETF MPLS draft currently defines nine different subtypes for the stream member descriptor. For example, the structure of SMD subtype 9 is illustrated in FIG. 3. SMD subtype 9 300 is utilized in mapping messages for flows defined by the following characteristics: (i) source IP address, (ii) source port, (iii) destination IP address, and (iv) destination port. The source IP address 310 is a four octet source network address. The destination IP address 320 is a four octet destination network address. A two octet field is used to identify the source port 335 associated with the source IP address 310. Similarly, a two octet field is used to identify the destination port 330 associated with the destination IP address 320. A protocol field 340 is utilized to identify the protocol associated with the packet being conveyed and a direction field 350 is utilized to indicate the label switching path (LSP) direction.

Figure 4:
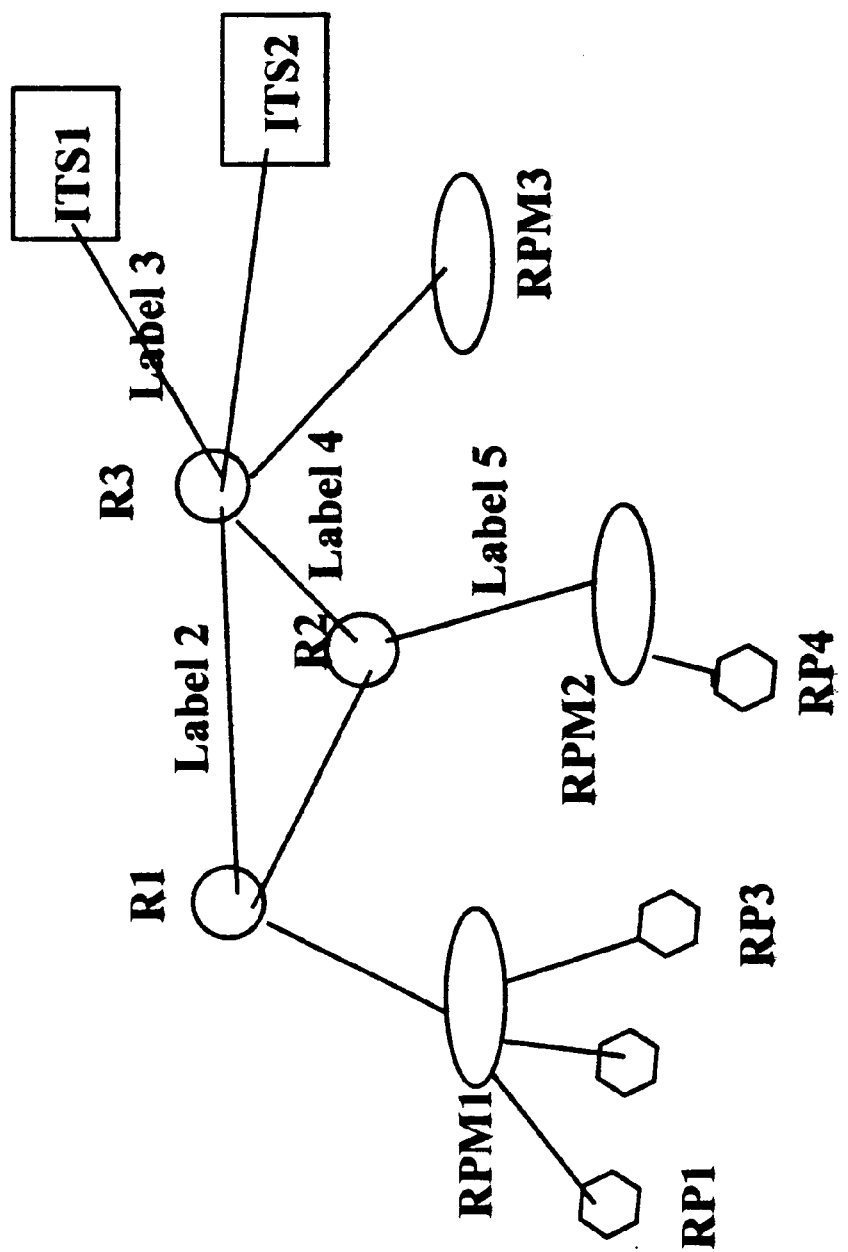
FIG. 4 is a diagram of an exemplary architecture for a Multi-Protocol Label Switching network used in conjunction with the present invention.

Referring to FIG. 4, there is shown an exemplary architecture for a Multi-Protocol Label Switching (MPLS) network 400 for use in conjunction with the present invention. The network structure is similar to that associated with that previously described in conjunction with FIG. 1. The MPLS network is comprised of a plurality of individual Label Switching Routers (LSRs) 402, LSR-1 through LSR-8. A plurality of Internet Telephony Servers 404 are utilized, each Internet Telephony Server (ITS) individually coupled with a Label Switching Router 402 positioned at the periphery of the MPLS network 400. As illustrated, ITS-1 is coupled with LSR-1, ITS-2 is coupled with LSR-2, ITS-3 is coupled with LSR-3, ITS-4 is coupled with LSR-4, ITS-5 is coupled with LSR-5, and ITS-6 is coupled with LSR-6. Individual Internet Telephony Servers 404 provide Internet telephony communications services to subscribers using access devices 106.

Figure 5:
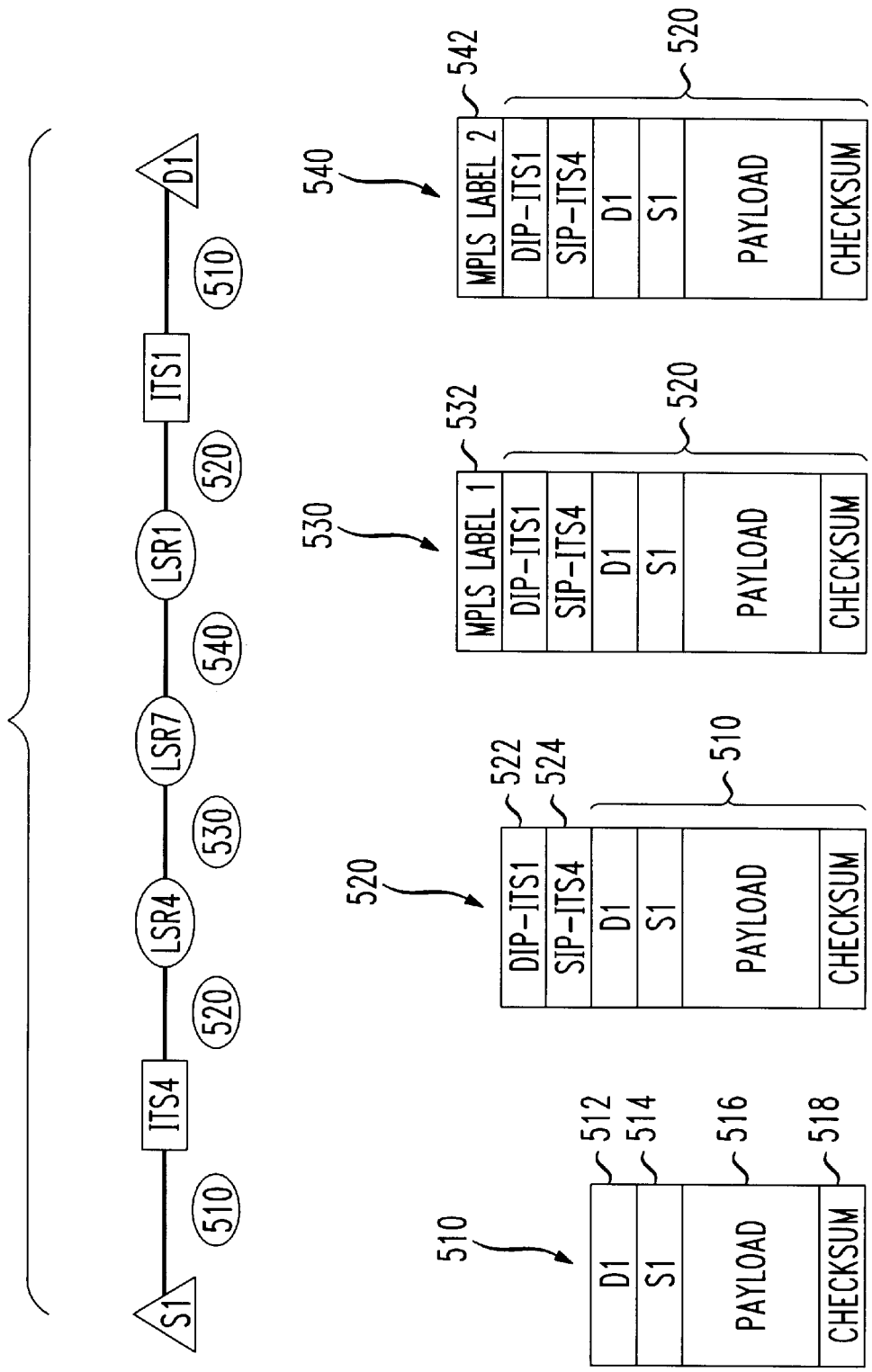
FIG. 5 is a diagram of an exemplary forwarding path over the network illustrated in FIG. 4, and the accompanying packet structure at various points along the path, in accordance with an exemplary embodiment of the present invention.

FIG. 5 illustrates how a flow of packets from Source PC access device S-1 to destination PC access device D-1 is conveyed over the Multi-Protocol Label Switching (MPLS) network of FIG. 4. FIG. 5 illustrates only those components and nodes included within an anticipated exemplary path between S-1 and D-1 over the MPLS network. Access device S-1 is serviced by ITS-4 and access device D-1 is serviced by ITS-1. An exemplary label switching path (LSP) through the network 400 and between ITS-4 and ITS-1 is therefore switched through Label Switching Router (LSR) nodes LSR 4, LSR-7, and LSR-1. Although communication between ITS-4 and ITS-1 is bi-directional, only the processes relating to that information transferred from source S-1 to destination D-1 is described, it being understood that communications transferred from D-1 to S-1 would typically possess process, procedural, and structural symmetry.

For an Internet telephony call connection, the structure of exemplary IP packet 510 conveyed from source S-1 to ITS-4 is comprised of a destination IP address (DIP) 512, a source IP address (SIP) 514, an IP packet payload 516, and a checksum value 518. ITS-4 creates an IP-in-IP tunnel packet 520 by encapsulating the IP packet 510 with an ITS-1 DIP 522 and an ITS-4 SIP 524. ITS-4 then routes packet 520 to LSR-4. LSR-4 appends MPLS label 1 532 to create labeled IP packet 530. IP packets 530 with MPLS label 1 532 appended are utilized for switching packet traffic having a common label switching path segment from LSR-4 to LSR-7. LSR-7 removes MPLS label 1 532 and appends MPLS label 2 542 to create labeled IP packet 540. IP packets 540 with MPLS label 2 542 appended are utilized for switching packet traffic having a common label switching path segment from LSR-7 to LSR-1. LSR-1 removes MPLS label 2 542 and routes packet 520 to ITS-1. ITS-1 removes the ITS-1 DIP 522 and ITS-4 SIP 524 to recreate the original IP packet 510 and routes IP packet 510 to D-1.

Figure 6:
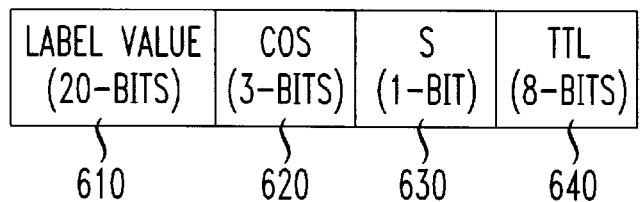
FIG. 6 is a diagram of an exemplary structure format for a label stack entry, in accordance with an exemplary embodiment of the present invention.

Implementation of MPLS within a network is accomplished using a set of procedures for augmenting network layer packets with label stacks, thereby converting the network layer packets into labeled packets. As previously described, routers which support MPLS are known as Label Switching Routers (LSRs). In order to transmit a labeled packet over a particular label switching path link, an LSR must support an encoding which given a label stack and a network layer packet, produces a labeled packet. Label stacks are appended to IP packets and are embedded below the data link layer header, but prior to any network layer headers, within the protocol hierarchy. FIG. 6 illustrates an exemplary structure for label stack entry format 600. The label stack entry is comprised of the label value field 610, a Class of Service (CoS) field 620 used to define a optionally guaranteed Quality of Service (QoS) between a provider and a subscriber, a Bottom of Stack bit (S) 630, and a Time-to-Live (TTL) field 640 used to delineate the maximum numbers of hops a packet is allowed in the network while being transported.

The first-used label stack entry appears as the first label stack entry in the stack. The last-used label stack entry appears as the last label stack entry in the stack. This last label stack entry in the label stack has the S bit 630 set to indicate that it is the final label stack entry. All other label stack entries in the label stack have S bits which are not set. Immediately following the last label stack entry is the network layer packet. Since no protocol field is specified, the network layer packet protocol used is inferable from the label value 610 which is assigned to the last label stack entry.

Not all IP networks completely support MPLS. That is, many IP networks may be comprised of Label Switching Routers (LSRs) and conventional routers. As previously described, LSRs are operable to perform either layer two switching or layer three forwarding and therefore fully support MPLS. However, conventional routers perform only layer three forwarding. Therefore, IP headers are currently not removed so that if an LSR conveys a labeled IP packet to a conventional router, the conventional router can parse the header and reveal the original tunneled IP packet.

For the purposes of a description of an exemplary embodiment of the present invention, voice packets are defined as a plurality of encoded data representing individual calls originating from a particular Internet Telephony Server (ITS), referred to as the source ITS. However, it would be understood to those skilled in the art that the present invention is also applicable to other packetized data flows conveyed over an MPLS network; including but not limited to MPEG video, UMTS, multi-media conferencing, or any other stream of data conveyed utilizing packet protocols. Voice packets are then multiplexed to form IP packets at the source ITS and conveyed over the MPLS network to a destination ITS. The IP source address (SIP) is the IP address for the source ITS. The IP destination address (DIP) is the IP address for the destination ITS.

A plurality of variant schemes may be utilized, but for purposes of analysis, assume that voice packets for each call are encoded into ten byte packets and that a unique three byte header is appended to each voice packet to identify the voice connection. Twenty-eight bytes of overhead is incurred for UDP/IP header If eight voice calls are multiplexed within one IP packet, then the overhead for packet transmission is:

$$(24+28)/(80+24+28)=39\%.$$

Using the protocols, structures, and procedures currently outlined in the IETF MPLS draft, IP packets are assigned a label for each ITS-to-ITS flow. If it is assumed that each MPLS label is four bytes, the packet transmission overhead is even greater:

$$(24+28+4)/(80+24+28+4)=41\%.$$

Advantageously, the present invention utilizes a newly created Stream Member Descriptor (SMD) which enables MPLS packet transmission with partial or complete removal of IP headers thus providing enhanced bandwidth efficiency and elegant, scaleable, and robust merging and splitting of switched packet flows at individual Label Switching Routers (LSRs). The new Stream Member Descriptor associated with the present invention is hereinafter defined as SMD subtype 10. Although the instant embodiment of the present invention is described utilizing upstream label assignment, it is equally applicable for use with downstream label assignment, as would be apparent to those skilled in the art.

Figure 7:
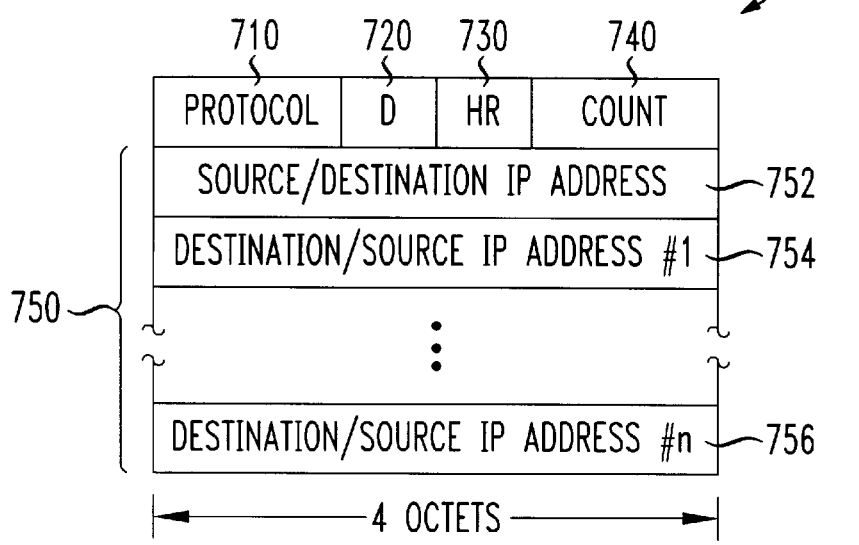
FIG. 7 is a diagram of the structure for a unique Stream Member Descriptor, in accordance with an exemplary embodiment of the present invention.

An exemplary embodiment of the SMD subtype 10 structure 700 is illustrated in FIG. 7. The protocol field 710 is used to provide the receiving Label Switching Router (LSR) with the identity of the network layer protocol associated with the packet flow being established. A direction field (D) 720 is included to indicate whether upstream or downstream label distribution is being utilized. A header removal (HR) field 730 is included to instruct the receiving LSR how to process the IP headers of labeled IP packets associated with a particular flow.

In accordance with the present invention, a labeled session is defined as an aggregated flow of IP packets using a common label for transport between two or more Label Switching Routers (LSRs). A count field 740 is included within the SMD subtype 10 message to provide the receiving LSR with the number of flows included within the aggregated flow associated with a labeled session. IP addresses 750 corresponding to the source IP device and the destination IP device may be included within the SMD subtype 10 message. A total of n IP addresses are shown within the SMD subtype 10 message of FIG. 7. This information is stored at the receiving LSR to supply source and destination information associated with individual packets arriving at the LSR without a complete IP header, or with no IP header at all. Details pertaining to the advantageous method for efficiently conveying packets with minimal overhead are subsequently presented.

The length of SMD subtype 10 is also determined inferentially from the value of the count field 740 and the header removal field 730. For example, assume an aggregated flow is established between a source LSR and a destination LSR and that the aggregated flow is diverged at the destination LSR into three smaller flows to three other LSRs. This is an example of source based merging, which will be subsequently described in detail. Then the SMD subtype 10 message used to establish the aggregated flow will inform the destination LSR of the common source IP address 752, a first LSR destination IP address 754, a second LSR destination IP address, and a third LSR destination IP address 756. In this case, the value of n is three. Assume that the total length of the protocol field 710, the direction field 720, the header removal field 730, and the count field 740 is four octets; and that each IP address is four octets in length. The count field is set to the value of n, namely three. Therefore, the SMD subtype 10 message includes four IP addresses and the message total length is twenty octets.

As previously described, the header removal field 730 supplies the receiving LSR with information regarding the header structure of packets associated with an aggregated flow. Assuming a two bit header removal field 730, the following values for HR are available and defined:

If HR=00, don't remove Source or Destination IP header addresses,

If HR=01, remove only Source IP header address,

If HR=10, remove only Destination IP header address, and

If HR=11, remove both Source and Destination IP header addresses.

For ease of reconstruction of the IP header, a unique value is assigned to the protocol field 710, indicating that the protocol is assigned for IP telephony. Similarly, a range of protocol field 710 values may be assigned for IP telephony so that the unique IP protocol may be inferred inferentially. Further, it may also be assumed that label stack entries similar in structure to those previously described in conjunction with FIG. 6 may be used. However, various alternative embodiments for the structure of individual label stack entries may also be utilized in conjunction with the present invention, as would be apparent to those skilled in the art.

Destination Based Merging

Referring again to FIG. 4, assume that two independent packet flows are established over the illustrated MPLS network 400. One flow is from source ITS-4 through LSR-4, LSR-7, and LSR-1 to destination ITS-1. The other flow is from source ITS-5 through LSR-5, LSR-7, and LSR-1 to destination ITS-1. Regardless of the source of the packet flow, once a packet is received at LSR-7 for switching throughout the remainder of the network, the remainder of the label switching path (from LSR-7 to LSR-1 and onto ITS-1) is the same for both flows. It would be advantageous, therefore, if a method of assigning labels to Label Switching Routers (LSRs) was created wherein the two packet flows could be merged, the IP headers associated with either flow's packets could be either completely or partially removed, and a common Multi-Protocol Label Switching (MPLS) label could be applied to packets associated with either flow. The present invention achieves these goals and provides improved performance in that available bandwidth is better utilized while concurrently allowing for easily merging and splitting packet flow traffic.

Figure 8:
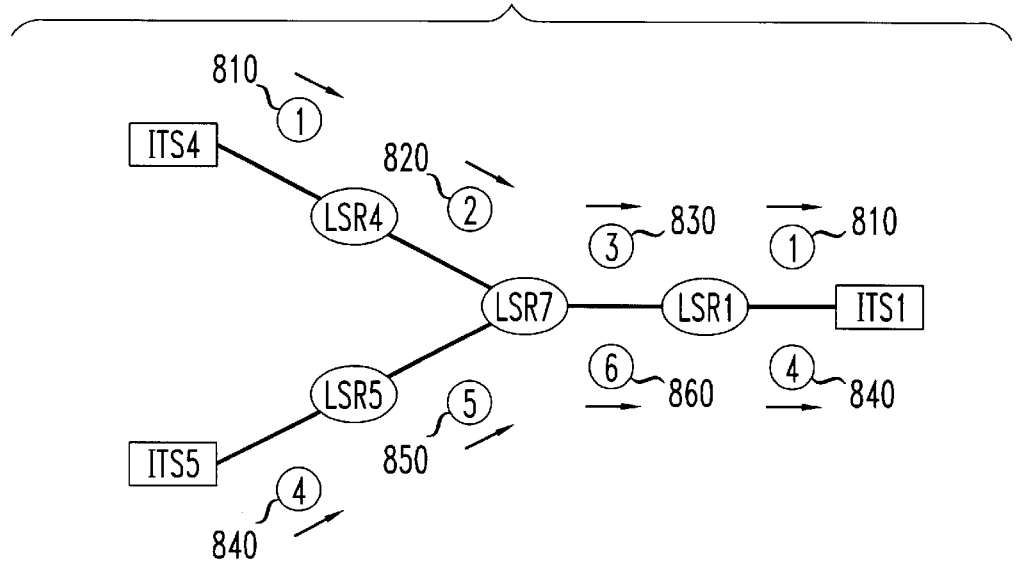
FIG. 8 is an illustration of those nodes and portions of a Multi-Protocol Label Switching network, and the various corresponding packet structures, used to implement destination based merging, in accordance with an exemplary embodiment of the present invention.
Figure 8:
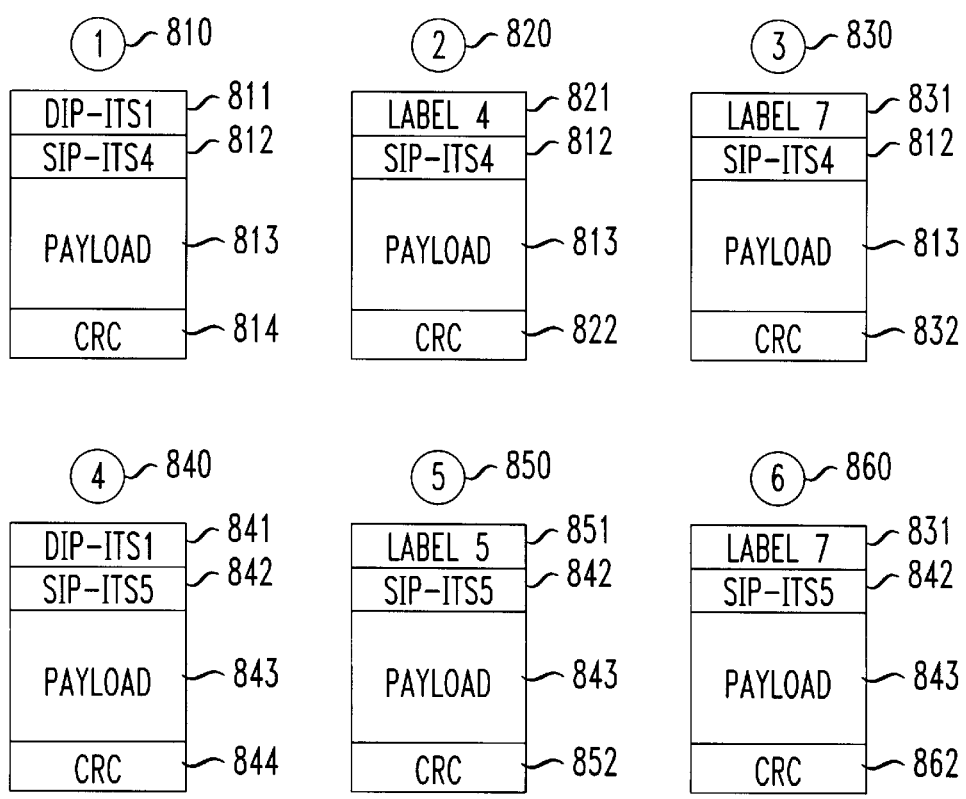

Referring to FIG. 8, there are shown those nodes and portions of the network architecture utilized for the aforementioned two flow paths and in accordance with an exemplary embodiment of the present invention in which destination based merging is utilized. Additionally illustrated in FIG. 8 are the associated packet structures at various points along the switched path for both packet flows, also in accordance with the exemplary embodiment of the present invention used for destination based merging.

Destination based merging, in conjunction with an embodiment of the present invention, refers to the merging of packet flows at a Label Switching Router (LSR) from two or more sources, the resulting merged packet flow is delivered to a common destination or intermediate LSR. In the embodiment illustrated in FIG. 8, packet flows from LSR-4 and LSR-5 are merged at LSR-7 which conveys the merged packet flow to LSR-1 and onto ITS-1. This merged flow from LSR-7 is defined as an aggregated packet flow. The decision to merge two or more flows into an aggregated packet flow may alternatively be made either (i) as a result of a resident traffic control algorithm at individual Label Switching Routers (an exemplary algorithm is subsequently described herein), or (ii) as a result of a manual configuration or selection.

In order to establish this aggregated flow, LSR-4 conveys a SMD subtype 10, as defined in accordance with the present invention, as a Stream Member Descriptor within an Advertisement message to LSR-7. Also included within the Advertisement message, or contained within a subsequent Advertisement message, is a label object definition. The following field values are defined by SMD subtype 10:

DIP=ITS-1
SIP=ITS-4
Protocol=Internet telephony
Count=1
D=0
HR=10

The destination IP address (DIP) informs LSR-7 that packets associated with the instant flow have ITS-1 as a final destination. The source IP address (SIP) informs LSR-7 that packets associated with the instant flow have ITS-4 as the originating source. The protocol field identifies the packet flow as Internet telephony. The direction field (D=0) indicates that upstream label assignment is utilized. The count field (Cnt=1) indicates that the SMD subtype 10 received is associated with a first flow to be merged within the aggregated flow at LSR-7. The header removal field (HR=10) indicates that subsequent packets received at LSR-7 associated with the flow between LSR-4 and LSR-7 will include the source IP address (SIP), but will have the destination IP address (DIP) removed. The label object definition contains a defined label value unique to labeled packets associated with a flow from LSR-4 to LSR-7. This information conveyed in the Advertisement message(s) can be written in a shortened format as:

[SMD=(Subtype=10, SIP=ITS-4, Cnt=1, DIP=ITS-1, HR=10), label 4].

Upon receiving the above-identified Advertisement message(s), LSR-7 constructs a table containing the following fields and associated field values:

| SIP | DIP | Incoming Label | HR | Outgoing Label |
|-----|-----|----------------|-----|----------------|
| ITS-4 | ITS-1 | 4 | 10 | 7 |

Similarly, LSR-5 conveys a SMD subtype 10, as defined in accordance with the present invention, as a Stream Member Descriptor within an Advertisement message to LSR-7. Also included within the Advertisement message, or contained within a subsequent Advertisement message, is a label object definition. This information conveyed in the Advertisement message(s) may be writtened in a shortened format as:

[SMD=(Subtype=10, SIP=ITS-5, Cnt=1, DIP=ITS-1, HR=10), label 5].

Upon receiving the above-identified Advertisement message(s), LSR-7 adds the field values to the previously constructed table, so that the table contains the following information:

| SIP | DIP | Incoming Label | HR | Outgoing Label |
|-----|-----|----------------|-----|----------------|
| ITS-4 | ITS-1 | 4 | 10 | 7 |
| ITS-5 | ITS-1 | 5 | 10 | 7 |

Then, LSR-7 conveys a SMD subtype 10, as defined in accordance with the present invention, as a Stream Member Descriptor within an Advertisement message to LSR-1. Also included within the Advertisement message, or contained within a subsequent Advertisement message, is a label object definition. The following field values are defined by SMD subtype 10:

DIP=ITS-1
SIP1=ITS-4
SIP2=ITS-5
Protocol=Internet telephony
Count=2

D=0
HR=10

The destination IP address (DIP) informs LSR-1 that packets associated with the instant flow have ITS-1 as a final destination. The source IP addresses (SIP1 and SIP2) inform LSR-1 that packets associated with the two instant flows have ITS-4 and ITS-5 as the originating sources respectively. The protocol field identifies the packet flow as Internet telephony. The direction field (D=0) indicates that upstream label assignment is utilized. The count field (Cnt=2) indicates that the SMD subtype 10 received is associated with two merged flows within the aggregated flow from LSR-7. The header removal field (HR=10) indicates that subsequent packets received at LSR-1 associated with the flows between LSR-7 and LSR-1 will include the source IP addresses (SIP1 and SIP2), but will have the destination IP address (DIP) removed. The label object definition contains a defined label value unique to labeled packets associated with the aggregated flow from LSR-7 to LSR-1. This information conveyed in the Advertisement message(s) can be written in a shortened format as:

[SMD=(Subtype=10, DIP=ITS-1, Cnt=2, SIP1=ITS-4, SIP2=ITS-5, HR=10), label 7].

Packets corresponding to the packet flow between ITS-4 and LSR-4 have a Packet-1 structure 810 which includes a destination IP address (DIP) 811 corresponding to destination ITS-1, a source IP address (SIP) 812 corresponding to source ITS-4, the packet payload 813 and a CRC value 814. LSR-4 removes the DIP 811 and applies Label-4 821 and a CRC value 822, resulting in a Packet-2 structure 820 being conveyed to LSR-7. LSR-7, upon receiving a Packet-2 structure 820, removes Label-4 821 from the packet and applies Label-7 831 and a CRC value 832, resulting in a Packet-3 structure 830 which is conveyed to LSR-1. LSR-1 determines that the packet destination is ITS-1 from Label-7 831 and reinserts a DIP 811 value to restore the packet structure to the original Packet-1 structure 810 and conveys the resulting packet to destination ITS-1.

Similarly, packets corresponding to the packet flow between ITS-5 and LSR-5 have a Packet 4 structure 840 which includes a destination IP address (DIP) 841 corresponding to destination ITS-1, a source IP address (SIP) 842 corresponding to source ITS-5, the packet payload 843 and a CRC value 844. LSR-5 removes the DIP 841 and applies Label-5 851 and a CRC value 852, resulting in a Packet-5 structure 850 being conveyed to LSR-7. LSR-7, upon receiving a Packet-5 structure 850, removes Label-5 821 from the packet and applies Label-7 831 and a CRC value 862, resulting in a Packets structure 860 which is conveyed to LSR-1. LSR-1 determines that the packet destination is ITS-1 from Label-7 831 and reinserts a DIP 841 value to restore the packet structure to the original Packet-4 structure 840 and conveys the resulting packet to destination ITS-1.

Advantageously, destination merging is accomplished as a result of the previously described operations. Furthermore, removal of the destination IP address (DIP) produces a dramatic reduction in overhead costs and a correspondingly high increase in bandwidth efficiency. For example, assuming the present invention is utilized for voice telephony with eight voice calls multiplexed within a flow packet, and that voice packets for each call are encoded into ten byte packets, the packet transmission overhead is:

$(24+8+16)/(80+24+8+16)=37.5\%$.

Figure 9:
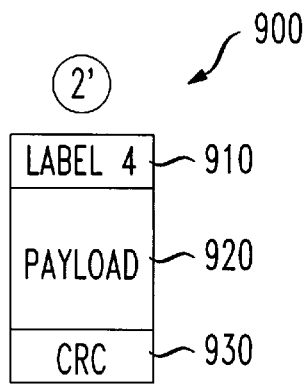
FIG. 9 is a diagram of an exemplary embodiment of a packet structure in which both source and destination Internet Protocol (IP) addresses are removed from switched packet IP headers corresponding to a labeled packet flow, in accordance with the present invention.

In reference to FIG. 9 in conjunction with FIG. 8, there is illustrated the packet structure for an alternative embodiment in which it is desired to reduce packet transmission overhead even further. In accordance with this embodiment, Packet-2' structure 900 includes payload 920, a CRC value 930, and Label-4 910. The IP header is removed completely, including both the source IP address and the destination IP address. The Advertisement message(s) used to establish this packet flow includes:

[SMD=(Subtype=10, SIP=ITS-4, DIP=ITS-1, HR=11), label 4].

Note that the header removal field is HR=11 in this case, indicating that both the source and destination IP addresses are removed in packets conveyed within this flow. To completely remove the IP headers, the LSR router inserts an extra byte in each labeled packet to identify flows within the aggregated flow. When header-less packets arrive at LSR-7, LSR-7 may reinsert the SIP header for Packet-2' structure 900 packets since the mapping table is resident at the Label Switching Router. In such an embodiment, the packet transmission overhead is:

$(24+8)/(80+24+8)=28.6\%$.

If we wish to further enhance packet transmission efficiency, the UDP header may be removed in subsequently transmitted packages within the flow by including the source and destination UDP port information within the SMD message establishing the flow. For such an embodiment, the packet transmission overhead is:

$(24)/(80+24)=23.1\%$.

However, such processing may introduce a greater cost in overhead than the original layer 3 forwarding would have resulted in. Such decisions are made by the network operator in order that packet transmission efficiency is achieved. Alternatively, LSR-7 may include an additional field which differentiates the various flows established between two LSRs and utilizing the same label, although an added signaling message set-up cost is incurred in order to do so. It is noted that increased bandwidth efficiency is achieved by complete or partial removal of the IP packet header, independent of whether packet flows are aggregated or split.

Source Based Merging

Referring again to FIG. 4, assume that two independent packet flows are established over the illustrated MPLS network 400. One flow is from source ITS-4 through LSR-4, LSR-7, and LSR-1 to destination ITS-1. The second flow also originates from source ITS-4 through LSR-4, and LSR-7, but from there is conveyed to LSR-2 and finally to ITS-2. Irrespective of the final destination for the packet flows, that portion of the label switching path from ITS-4 to LSR-7 is common for both flows. It would be advantageous, therefore, if a method of assigning labels to Label Switching Routers (LSRs) was created wherein the two packet flows could be merged with the same Multi-Protocol Label Switching (MPLS) label for the common label switching path portions, and the merged packet flows split at the appropriate Label Switching Router (LSR) for transport to their respective final destinations. Further, it would also be beneficial if the IP headers associated with either flow's packets could be either completely or partially removed. The present invention achieves these goals and provides improved performance in that available bandwidth is better utilized while concurrently allowing for easily merging and splitting packet flow traffic.

Figure 10:
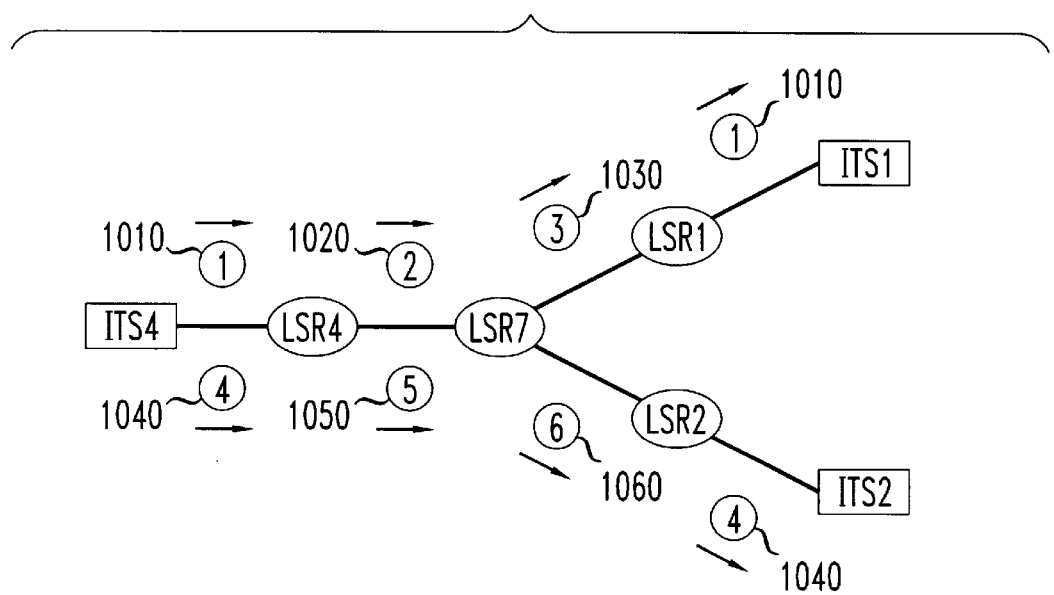
FIG. 10 is an illustration of those nodes and portions of a Multi-Protocol Label Switching network, and the various corresponding packet structures, used to implement source based merging, in accordance with an exemplary embodiment of the present invention.
Figure 10:
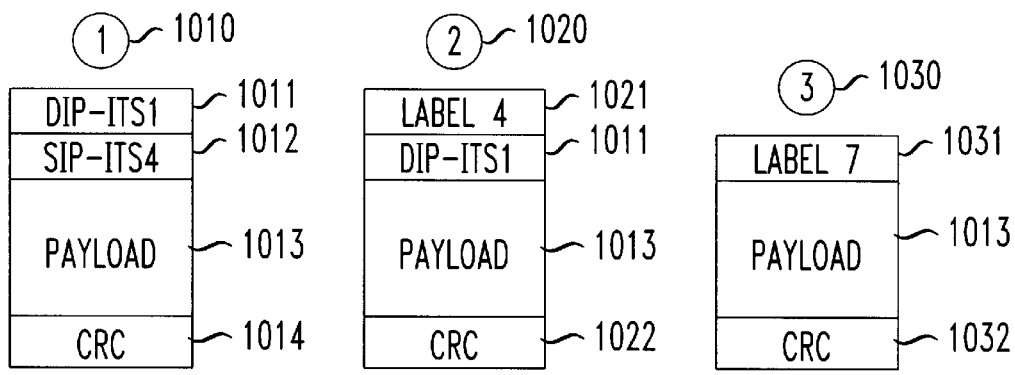
Figure 10:
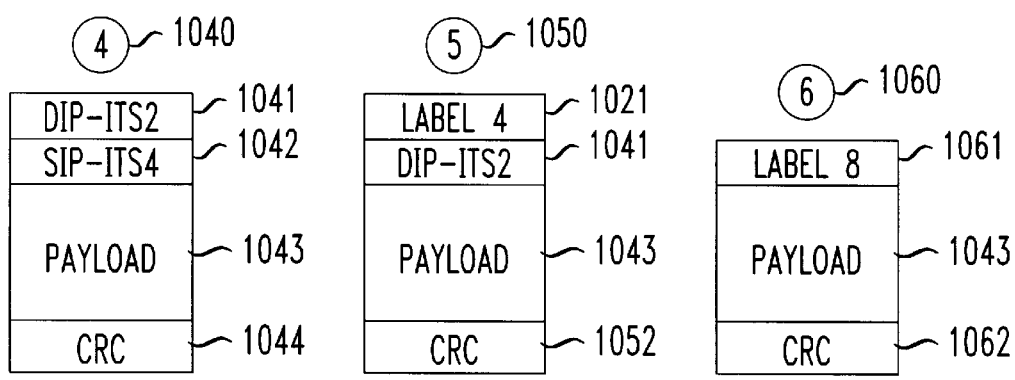

Referring to FIG. 10, there are shown those nodes and portions of the network architecture utilized for the aforementioned two flow paths used to illustrate source based merging in accordance with an exemplary embodiment of the present invention. Additionally illustrated in FIG. 10 are the associated packet structures at various points along the switched path for both packet flows, also in accordance with the exemplary embodiment of the present invention used for source based merging.

Source based merging, in conjunction with an embodiment of the present invention, is used to merge two or more independent packet flows at a Label Switching Router (LSR) for a portion of the label switching path which is common to those flows, and then splitting the two or more independent packet flows along the independent portions of their label switching paths for transport to their individual destinations. In the embodiment illustrated in FIG. 10, a first packet flow is conveyed from ITS-4 to ITS-1 and a second packet flow is conveyed from ITS-4 to ITS-2. The IP forwarding path and the label switching path from ITS-4 to intermediate Label Switching Router (LSR) LSR-7 is common to both flows. Along this common portion of the network, the two packet flows are merged into an aggregated packet flow. At router LSR-7, the aggregated packet flow splits and diverges, conveying the first packet flow to ITS-1 through LSR-1 and conveying the second packet flow to ITS-2 through LSR-2. The decision to merge two or more packet flows for that portion of the label switching path which is common may alternatively be made either (i) as a result of a resident traffic control algorithm at individual Label Switching Routers (an exemplary algorithm is subsequently described herein), or (ii) as a result of a manual configuration or selection.

Much of the description associated with the establishment of destination based merging, previously described, is equally applicable in the instant and subsequent embodiments of the present invention. Therefore, details common to the various embodiments will not be subsequently repeated, but reference may be made to the applicable portion if desired. To this end, only the shorthand format for Advertisement message content will be subsequently used. Furthermore, table construction, label assignment, and field value storage within memory at implementing Label Switching Routers will not be revisited in detail either.

First, if the determination is made at LSR-4 (via either manual configuration or resident traffic control algorithm) that it would be expedient to merge the packet flow to ITS-1 and the packet flow to ITS-2, then LSR-4 sends the following Stream Member Descriptor to LSR-7 within an Advertisement message:

[SMD=(Subtype=10, SIP=ITS-4, Cnt=2, DIP1=ITS-1, DIP2=ITS-2, HR=01), label 4].

Since the header removal field is set to a value of HR=01, LSR-7 is thus informed that packets arriving from both flows comprising the aggregated flow will have the source IP address removed. The count field (Cnt) set a value of 2 indicates that the aggregated flow is comprised of two separate flows. The first destination IP address (DIP1) set to a value corresponding to the ITS-1 address indicates that the first packet flow included within the aggregated flow has a final destination of ITS-1. The second destination IP address (DIP2) set to a value corresponding to the ITS-2 address indicates that the second packet flow included within the aggregated flow has a final destination of ITS-2.

Second, LSR-7 sends the following Stream Member Descriptor to LSR-1 within an Advertisement message:

[SMD=(Subtype=10, SIP=ITS-4, Cnt=1, DIP=ITS-1, HR=11), label 7].

Since the header removal field is set to a value of HR=11, LSR-1 is thus informed that packets arriving from the split flow at LSR-7 will have the source and destination IP addresses removed. The count field (Cnt) set to a value of 1 indicates that the subsequently received packet flow is the first or only packet flow being conveyed from LSR-7 to LSR-1. The destination IP address (DIP) set to a value corresponding to the ITS-1 address indicates that the packet flow has a final destination of ITS-1.

Third, LSR-7 sends the following Stream Member Descriptor to LSR-2 within an Advertisement message:

[SMD=(Subtype=10, SIP=ITS-4, Cnt=1, DIP=ITS-2, HR=11), label 8].

Since the header removal field is set to a value of HR=11, LSR-2 is thus informed that packets arriving from the split flow at LSR-7 will have the source and destination IP addresses removed. The count field (Cnt) set to a value of 1 indicates that the subsequently received packet flow is the first or only packet flow being conveyed from LSR-7 to LSR-2. The destination IP address (DIP) set to a value corresponding to the ITS-2 address indicates that the packet flow has a final destination of ITS-2.

Packets conveyed from ITS-4 to LSR-4 having a final destination of ITS-1 have a Packet-1 structure 1010 which includes a destination IP address (DIP) 1011 corresponding to destination ITS-1, a source IP address (SIP) 1012 corresponding to ITS-4, a packet payload 1013 and a CRC value 1014. LSR-4 removes the SIP 1012 and applies Label-4 1021 and a CRC value 1022, resulting in a Packet-2 structure 1020 for conveyance to LSR-7. LSR-7, upon receiving a Packet-2 structure 1020, removes Label-4 1021 from the packet, removes the DIP 1011 from the packet, appends Label-7 1031 to the packet, and appends a CRC value 1032, resulting in a Packet-3 structure 1030 for conveyance to LSR-1. LSR-1 determines the original DIP 1011 and SIP 1012 from information stored from the previously received Advertisement message(s). LSR-1 then removes Label-7 from the packet and appends the original DIP 1011 and SIP 1012 to recreate the original Packet-1 structure 1010 and conveys the resulting packet to destination ITS-1.

Similarly, packets conveyed from ITS-4 to LSR-4 having a final destination of ITS-2 have a Packet-4 structure 1040 which includes a destination IP address (DIP) 1041 corresponding to destination ITS-2, a source IP address (SIP) 1042 corresponding to ITS-4, a packet payload 1043 and a CRC value 1044. LSR-4 removes the SIP 1042 and applies Label-4 1021 and a CRC value 1052, resulting in a Packet-5 structure 1050 for conveyance to LSR-7. LSR-7, upon receiving a Packet-5 structure 1050, removes Label-4 1021 from the packet, removes the DIP 1041 from the packet, appends Label-8 1061 to the packet, and appends a CRC value 1062, resulting in a Packet-6 structure 1060 for conveyance to LSR-2. LSR-2 determines the original DIP 1041 and SIP 1042 from information stored from the previously received Advertisement message(s). LSR-2 then removes Label-8 from the packet and appends the original DIP 1041 and SIP 1042 to recreate the original Packet 4 structure 1040 and conveys the resulting packet to destination ITS-2.

Merging Algorithm and Label Issuance

As previously described, the decision to merge two or more flows into an aggregated packet flow may alternatively be made either (i) as a result of a manual configuration or selection, or (ii) as a result of a resident traffic control algorithm at individual Label Switching Routers. An example of a manual configuration or selection process is to decide whether or not to merge based upon historical hourly, daily, and/or monthly packet traffic density profiles between specified pairs of Internet Telephony Servers (ITSs).

Figure 11:
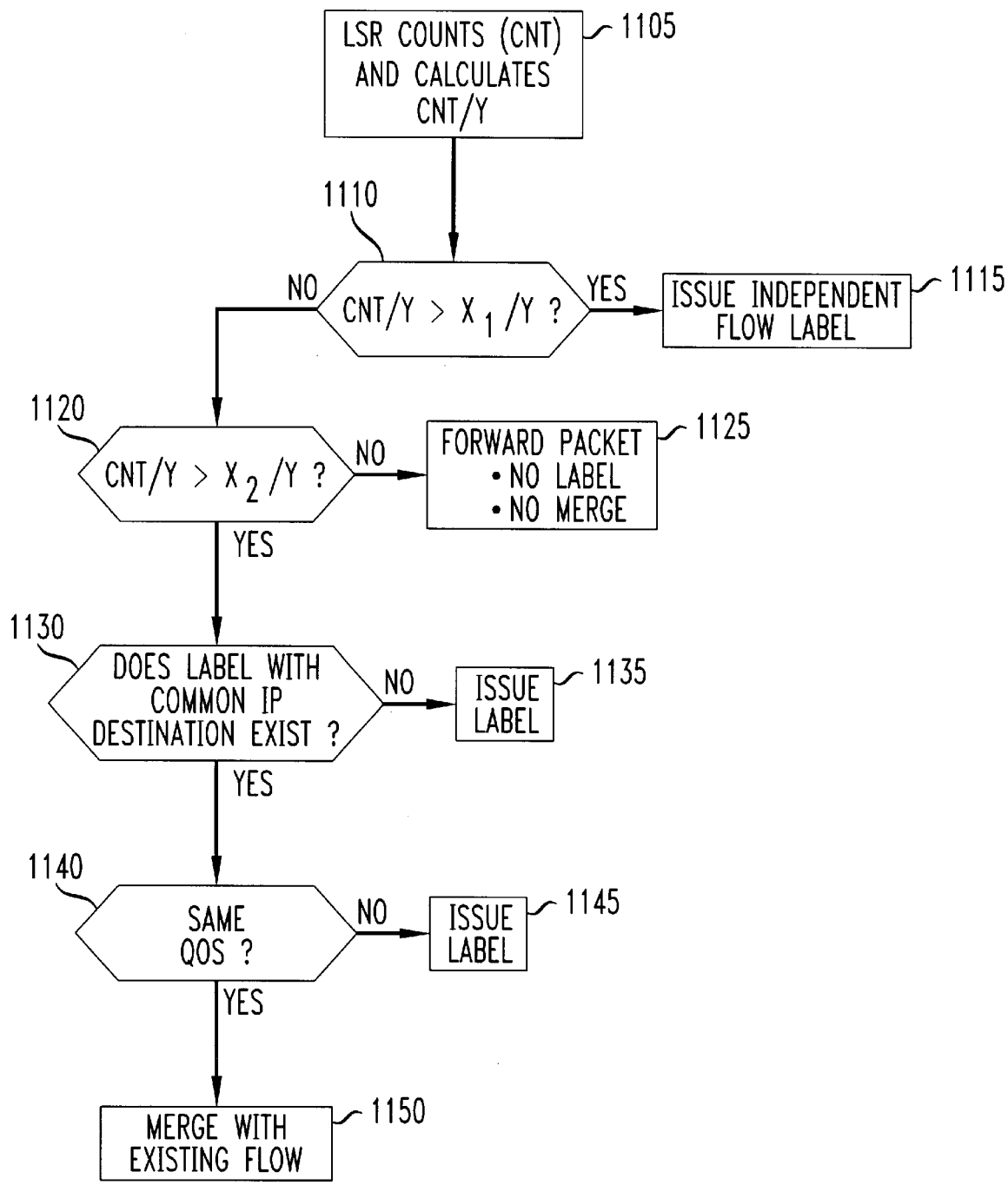
FIG. 11 is a flow diagram illustrating a traffic control method for use in conjunction with a Label Switching Router, in accordance with an exemplary embodiment of the present invention.

A Label Switching Router (LSR) traffic control algorithm flow diagram is illustrated in FIG. 11, in accordance with an exemplary embodiment of the present invention. Traffic control function programs for routers are typically implemented with resident processor capability and storage capacity available in existing Label Switching Routers (LSRs). The traffic control method presented herein similarly utilizes such available processor capability and storage capacity for implementation. The method described not only monitors traffic to search for opportunities to provide switching labels to enhance network efficiency, but further monitors traffic to search for opportunities to merge packet flows with existing packet flows, thereby enhancing network efficiency even greater. In the following description of an exemplary embodiment of the traffic control method, it is assumed that upstream label assignment is utilized and that opportunities for destination based merging are identified. Such an embodiment of the present invention is merely illustrative, however, it being understood by those skilled in the art that the procedure is equally applicable for downstream label assignment, source based merging, and/or combined source/destination based merging schemes.

In accordance with step 1105, an LSR processor identifies a count (CNT), over a given count time interval (Y), of the number of packets received which have a common downstream IP address. The LSR processor therefore calculates a path specific packet transport density, either directly or inferentially, and temporarily stores the value in memory for subsequent use. Direct calculation of the packet transport density (CNT/Y) is performed by dividing the count value by the given count time interval. Inferential calculation of the packet transport density utilizes a value representing the count value (CNT) directly and stores this value in memory, not using the count time interval (Y) to operate on the count. However, since subsequently described packet transport threshold values are chosen in light of knowledge of the value of the count time interval (Y), the identified and stored value of CNT is therefore proportional to CNT/Y and inferentially may be chosen to represent CNT/Y. For the purposes of the instant description, however, direct calculation of the packet transport density is utilized. It should also be noted that the CNT is identified individually and independently for each packet originating source conveying packets to the LSR.

The instant embodiment of the present invention utilizes a first packet transport density threshold value ($X_1/Y$) and a second packet transport density threshold value ($X_2/Y$). Values are assigned such that $X_1/Y$ is a greater value than $X_2/Y$, that is, that the first packet transport density threshold value is greater in magnitude than the second packet transport density threshold value. The threshold values are stored in memory and are accessible by the LSR processor for use in determining (i) whether to issue a switching label and (ii) whether to merge two packet flows sharing a common link which includes the LSR as an originating or terminating node in the common link. In accordance with step 1110, if the packet transport density (CNT/Y) for forwarded and unlabeled packets arriving at the LSR from a first prior node, and destined for a downstream LSR, is greater than the first packet transport density threshold value ($X_1/Y$), then an independent label is issued, in accordance with step 1115. The label produced as a result of step 1115 is utilized to establish an exclusive dedicated high volume packet flow link for a labeled switching path. That is, the packet transport density associated with this high volume packet flow is so great as to warrant a dedicated label, and packet flows subsequently identified as sharing the same common portion of the labeled switching path will not utilize the independent label.

Referring once more to step 1110, if the packet transport density (CNT/Y) for forwarded and unlabeled packets arriving at the LSR from the first prior node, and destined for the downstream LSR, is less than or equal to the first packet transport density threshold value ($X_1/Y$), then a second comparison is performed. In accordance with step 1120, if the packet transport density (CNT/Y) for forwarded and unlabeled packets arriving at the LSR from the first prior node, and destined for the downstream LSR, is less than or equal to the second packet transport density threshold value ($X_2/Y$), then subsequent corresponding packets are forwarded via conventional layer three forwarding, in accordance with step 1125. No label is issued because the calculated packet transport density is considered too small to warrant the additional overhead costs incurred in establishing a switched path. Since a layer two switched packet flow is not established, flow merging is not established either.

However, in accordance with step 1120, if the packet transport density (CNT/Y) for forwarded and unlabeled packets arriving at the LSR from the first prior node, and destined for the downstream LSR, is greater than the second packet transport density threshold value ($X_2/Y$), then the calculated packet transport density is not considered too small to warrant the additional overhead costs incurred in establishing a switch path. The LSR processor then searches for a label for an established layer two packet flow having a common downstream LSR destination. If no label exists for an established layer two packet flow having a common downstream LSR destination, then in accordance with step 1135, a label is issued to enable a subsequent packet flow over the same downstream path via labeled layer two switching.

If a label does exist for an established layer two packet flow having a common downstream LSR destination, then the Quality of Service (QoS) guarantee associated with the packet flow utilizing the preexisting label is compared to the QoS guarantee associated with the forwarded and unlabeled packets arriving at the LSR from a first prior node, and destined for a downstream LSR, in accordance with step 1140. If the QoS guarantees are not the same, then in accordance with step 1145, a new label is issued to enable a subsequent packet flow over the same downstream path via labeled layer two switching. If however, the QoS guarantees are for the same level of service, then in accordance with step 1150, a merging opportunity has been identified and the preexisting label is also applied to the forwarded and unlabeled packets arriving at the LSR from a first prior node, and destined for a downstream LSR. This effectively creates a new second flow merged with the first preexisting flow, thus increasing transport efficiency by: (i) allowing layer two switching instead of layer three packet forwarding, (ii) using one label for switching the packets associated with two flows instead of assigning separate labels for each, and (iii) minimizing the signaling required to establish packet flows for those opportunities when two or more flows are merged using one label for transport.

The foregoing description merely illustrates the principles of the invention. It will thus be appreciated that those skilled in the art will be able to devise various arrangements which, although not explicitly described or shown herein, embody the principles of the invention and are included within its spirit and scope. For example, although the embodiments illustrated and described a method for destination based merging and a method for source based merging, it also be apparent to those skilled in the art to combine the source and destination based merging embodiments for use concurrently. Furthermore, although the foregoing description and illustrations were shown implemented over the Internet backbone, the invention is equally applicable to other mediums and implementations using system interconnecting nodes capable of layer two switching of packets, including but not limited to, broadcasting and multicasting applications and mobile networks.

Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for establishing a switched packet flow from a router comprising the steps of:
   identifying a plurality of packets having a common destination node; and
   transmitting at least one control message to establish a switched packet flow of said plurality of packets to said common destination node, said at least one control message including at least:
      (a) a label mapping message corresponding to said switched packet flow, and
      (b) a header removal field
   wherein each of said plurality of packets is comprised of a packet header, said packet header including a source address and a destination address if said header removal field is assigned a predetermined value.

2. A method for establishing a switched packet flow from a router comprising the steps of:
   identifying a plurality of packets having a common destination node; and
   transmitting at least one control message to establish a switched packet flow of said plurality of packets to said common destination node, said at least one control message including at least:
      (a) a label mapping message corresponding to said switched packet flow, and
      (b) a header removal field
   wherein each of said plurality of packets is comprised of a packet header, said packet header including a source address but excluding a destination address if said header removal field is assigned a predetermined value.

3. A method for establishing a switched packet flow from a router comprising the steps of:
   identifying a plurality of packets having a common destination node; and
   transmitting at least one control message to establish a switched packet flow of said plurality of packets to said common destination node, said at least one control message including at least:
      (a) a label mapping message corresponding to said switched packet flow, and
      (b) a header removal field
   wherein each of said plurality of packets is comprised of a packet header, said packet header including a destination address but excluding a source address if said header removal field is assigned a predetermined value.

4. A method for establishing a switched packet flow from a router comprising the steps of:
   identifying a plurality of packets having a common destination node; and
   transmitting at least one control message to establish a switched packet flow of said plurality of packets to said common destination node, said at least one control message including at least:
      (a) a label mapping message corresponding to said switched packet flow, and
      (b) a header removal field
   wherein each of said plurality of packets is comprised of a packet header, said packet header excluding both a destination address and a source address if said header removal field is assigned a predetermined value.

5. A method for establishing a switched packet flow from a router comprising the steps of:
   identifying a plurality of packets having a common destination node; and
   transmitting at least one control message to establish a switched packet flow of said plurality of packets to said common destination node, said at least one control message including at least:

(a) a label mapping message corresponding to said switched packet flow, and
(b) a header removal field wherein a packet header is removed from each of said plurality of packets if said header removal field is assigned a predetermined value.

6. The method in accordance with claim 5 wherein said router is a Label Switching Router.

7. The method in accordance with claim 5 wherein ones of said at least one control message are stream member descriptors formulated within at least one Advertisement class message.

8. A method for establishing a switched packet flow from a router comprising the steps of:

identifying a plurality of packets having a common destination node; and transmitting at least one control message to establish a switched packet flow of said plurality of packets to said common destination node, said at least one control message including at least:
(a) a label mapping message corresponding to said switched packet flow, and
(b) a header removal field wherein a second switched packet flow is merged with said switched packet flow to form an aggregate packet flow to said common destination node, said aggregate packet flow utilizing a label assigned to said switched packet flow for transport.

9. The method in accordance with claim 8 wherein said aggregate packet flow is implemented in a source based merging scheme.

10. The method in accordance with claim 8 wherein said aggregate packet flow is implemented in a destination based merging scheme.

11. A method for establishing a labeled packet flow from a first Label Switching Router (LSR) to a second LSR, said method comprising the steps of:

identifying a plurality of packets originating from said first LSR and having said second LSR as a common destination node;

creating a label for said labeled packet flow at said first LSR, said label representing a switched transport path from said first LSR to said second LSR;

launching a label mapping message from said first LSR for transport to said second LSR, said label mapping message conveying an identity associated with said label to said second LSR;

determining a value for a header removal field, said value identifying whether a packet source address and a packet destination address are included within each of a plurality of packet headers associated with a corresponding plurality of packets which are subsequently launched and which comprise said labeled packet flow; and conveying said value for said header removal field to said second LSR, wherein said value for said header removal field is a first value if each of said plurality of packet headers excludes said packet source address and excludes said packet destination address.

12. The method in accordance with claim 11 wherein said value for said header removal field is a second value if each of said plurality of packet headers includes said packet source address and excludes said packet destination address.

13. The method in accordance with claim 11 wherein said value for said header removal field is a second value if each of said plurality of packet headers includes said packet destination address and excludes said packet source address.

14. The method in accordance with claim 11 wherein said value for said header removal field is a second value if each of said plurality of packet headers includes said packet source address and includes said packet destination address.

15. The method in accordance with claim 11 wherein said first LSR is included within a broadcast network.

16. The method in accordance with claim 11 wherein said first LSR is included within a multicast network.

17. The method in accordance with claim 11 wherein said first LSR is included within a mobile network.

18. The method in accordance with claim 11 wherein a second packet flow is merged with said labeled packet flow to form an aggregate packet flow from said first LSR.

19. The method in accordance with claim 18 wherein said aggregate packet flow is included within a source based merging scheme.

20. The method in accordance with claim 18 wherein said aggregate packet flow is included within a destination based merging scheme.

21. The method in accordance with claim 18 wherein said aggregate packet flow is included within a dual source based and destination based merging scheme.

22. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field, wherein each of said plurality of packets is comprised of a packet header, said packet header including a source address and a destination address if said header removal field is assigned a predetermined value.

23. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field, wherein each of said plurality of packets is comprised of a packet header, said packet header including a source address but excluding a destination address if said header removal field is assigned a predetermined value.

24. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field wherein each of said plurality of packets is comprised of a packet header, said packet header including a destination address but excluding a source address if said header removal field is assigned a predetermined value.

25. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field wherein each of said plurality of packets is comprised of a packet header, said packet header excluding both a destination address and a source address if said header removal field is assigned a predetermined value.

26. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field, wherein a packet header is removed from each of said plurality of packets if said header removal field is assigned a predetermined value.

27. A router operable to establish a switched packet flow, said router comprising a means for identifying a plurality of packets having a common destination node, said plurality of packets being forwarded through said router; and a means, responsive to an identification of said plurality of packets having said common destination address, for transmitting at least one control message to establish said switched packet flow, said at least one control message including at least:

a label mapping message corresponding to said switched packet flow; and a header removal field, wherein a second switched packet flow is merged with said switched packet flow to form an aggregate packet flow to said common destination node, said aggregate packet flow utilizing a label assigned to said switched packet flow for transport.

* * * * *